US010970755B2

(12) United States Patent
Doubinski et al.

(10) Patent No.: US 10,970,755 B2
(45) Date of Patent: Apr. 6, 2021

(54) SYSTEM, METHOD, AND COMPUTER PROGRAM FOR PROVIDING A WISH LIST USER INTERFACE WITHIN A WEB BROWSER THAT ALERTS USERS TO CHANGES IN MULTIFACTOR-BASED PRICES

(71) Applicant: Ebates Performance Marketing, Inc., San Francisco, CA (US)

(72) Inventors: Serge Doubinski, South San Francisco, CA (US); Diana Chen, Redwood City, CA (US); Andrey Vyrvich, San Francisco, CA (US)

(73) Assignee: EBATES PERFORMANCE MARKETING, INC., San Mateo, CA (US)

( * ) Notice: Subject to any disclaimer, the term of this patent is extended or adjusted under 35 U.S.C. 154(b) by 222 days.

(21) Appl. No.: 15/782,409

(22) Filed: Oct. 12, 2017

(65) Prior Publication Data
US 2018/0108054 A1 Apr. 19, 2018

Related U.S. Application Data

(60) Provisional application No. 62/407,962, filed on Oct. 13, 2016.

(51) Int. Cl.
*G06Q 30/02* (2012.01)
*G06F 3/0482* (2013.01)
*G06Q 30/06* (2012.01)
(52) U.S. Cl.
CPC ....... *G06Q 30/0283* (2013.01); *G06F 3/0482* (2013.01); *G06Q 30/0222* (2013.01); *G06Q 30/0601* (2013.01)

(58) Field of Classification Search
None
See application file for complete search history.

(56) References Cited

U.S. PATENT DOCUMENTS

| 4,910,672 A | 3/1990 | Off et al. |
| 5,250,789 A | 10/1993 | Johnsen |

(Continued)

FOREIGN PATENT DOCUMENTS

| CN | 101194282 | 6/2008 |
| JP | 10-240823 | 9/1998 |

(Continued)

OTHER PUBLICATIONS

International Search Report and Written Opinion in PCT Application No. PCT/US2017/056346 dated Jan. 4, 2018.

(Continued)

*Primary Examiner* — Gautam Ubale
*Assistant Examiner* — Michael J Cross
(74) *Attorney, Agent, or Firm* — Lessani Law Group, PC

(57) ABSTRACT

This disclosure relates to system, method, and computer program for providing a wish-list user interface within a web browser, for tracking "fully-stacked prices" for items in the wish list, and for alerting users to a drop in a fully-stacked price of an item in the wish list. A browser extension provides a wish list user interface within a user's web browser. Via the user interface, a user is able to add products from different merchant websites to the wish list. As each item is added to the wish list, an initial multifactor-based price (i.e., the fully-stacked price) is calculated for the item. While an item remains in the wish list, a backend server continues to track the multifactor-based price for the item. In response to detecting a drop in a multifactor-based price for an item in the wish list, the browser extension alerts the user to the price drop.

20 Claims, 11 Drawing Sheets

(56) References Cited

U.S. PATENT DOCUMENTS

| | | | |
|---|---|---|---|
| 5,500,890 | A | 3/1996 | Rogge et al. |
| 6,029,141 | A | 2/2000 | Bezos et al. |
| 6,101,482 | A | 8/2000 | DiAngelo et al. |
| 6,128,600 | A | 10/2000 | Imamura et al. |
| 6,341,353 | B1 | 1/2002 | Herman et al. |
| 6,460,036 | B1 | 10/2002 | Herz |
| 6,571,279 | B1 | 5/2003 | Herz et al. |
| 6,611,814 | B1 | 8/2003 | Lee et al. |
| 6,725,222 | B1 | 4/2004 | Musgrove et al. |
| 7,162,443 | B2 | 1/2007 | Shah |
| 7,305,355 | B2 | 12/2007 | Tarvydas et al. |
| 7,328,176 | B2 | 2/2008 | Tarvydas et al. |
| 7,512,548 | B1 | 3/2009 | Bezos et al. |
| 7,734,729 | B2 | 6/2010 | Du et al. |
| 7,752,535 | B2 | 7/2010 | Satyavolu |
| 7,925,546 | B2 | 4/2011 | Jacobi et al. |
| 8,036,934 | B2 | 10/2011 | Mankoff |
| 8,359,309 | B1 | 1/2013 | Provine et al. |
| 8,392,288 | B1 | 3/2013 | Miller |
| 8,489,456 | B2 | 7/2013 | Burgess et al. |
| 8,510,166 | B2 | 8/2013 | Neven |
| 8,527,436 | B2 | 9/2013 | Salaka et al. |
| 8,661,029 | B1 | 2/2014 | Kim et al. |
| 8,676,665 | B2 | 3/2014 | Tarvydas et al. |
| 8,694,511 | B1 | 4/2014 | Corduneanu et al. |
| 8,812,532 | B2 | 8/2014 | Skaf |
| 8,844,010 | B2 | 9/2014 | Brady et al. |
| 9,159,079 | B2 | 10/2015 | Lambert et al. |
| 9,201,672 | B1 | 12/2015 | Arana et al. |
| 9,384,504 | B2 | 7/2016 | Lampert |
| 9,779,441 | B1 | 10/2017 | Jadhav et al. |
| 9,922,327 | B2 | 3/2018 | Johnson et al. |
| 2001/0032128 | A1 | 10/2001 | Kepecs |
| 2001/0049628 | A1 | 12/2001 | Icho |
| 2002/0038255 | A1 | 3/2002 | Tarvydas et al. |
| 2002/0046109 | A1 | 4/2002 | Leonard et al. |
| 2002/0095335 | A1 | 7/2002 | Barnett et al. |
| 2002/0117544 | A1 | 8/2002 | Wolf et al. |
| 2002/0124255 | A1 | 9/2002 | Reichardt |
| 2002/0143660 | A1 | 10/2002 | Himmel et al. |
| 2003/0158844 | A1 | 8/2003 | Kramer et al. |
| 2004/0083134 | A1 | 4/2004 | Spero et al. |
| 2004/0122736 | A1 | 6/2004 | Strock et al. |
| 2004/0254855 | A1 | 12/2004 | Shah |
| 2005/0131768 | A1 | 6/2005 | Rodriguez et al. |
| 2005/0267809 | A1 | 12/2005 | Zheng |
| 2006/0122899 | A1 | 6/2006 | Lee et al. |
| 2006/0242011 | A1 | 10/2006 | Bell et al. |
| 2006/0259364 | A1 | 11/2006 | Strock et al. |
| 2006/0265281 | A1 | 11/2006 | Sprovieri et al. |
| 2007/0050258 | A1 | 3/2007 | Dohse |
| 2007/0203784 | A1 | 8/2007 | Keller et al. |
| 2007/0271147 | A1 | 11/2007 | Crespo et al. |
| 2008/0005090 | A1 | 1/2008 | Khan et al. |
| 2008/0033939 | A1 | 2/2008 | Khandelwal |
| 2008/0103887 | A1 | 5/2008 | Oldham et al. |
| 2008/0109327 | A1 | 5/2008 | Mayle et al. |
| 2008/0120129 | A1 | 5/2008 | Seubert et al. |
| 2008/0154731 | A1 | 6/2008 | Mesaros |
| 2008/0155547 | A1 | 6/2008 | Weber et al. |
| 2008/0208606 | A1 | 8/2008 | Allsop et al. |
| 2008/0319854 | A1 | 12/2008 | Duroux et al. |
| 2009/0024464 | A1 | 1/2009 | Weiss et al. |
| 2009/0083164 | A1 | 3/2009 | Hull et al. |
| 2009/0099920 | A1 | 4/2009 | Aharoni et al. |
| 2009/0234737 | A1 | 9/2009 | Sarelson et al. |
| 2009/0240588 | A1 | 9/2009 | Turner et al. |
| 2010/0042515 | A1 | 2/2010 | Crespo et al. |
| 2010/0049538 | A1 | 2/2010 | Frazer et al. |
| 2010/0161399 | A1 | 6/2010 | Posner et al. |
| 2010/0174623 | A1 | 7/2010 | McPhie et al. |
| 2010/0205068 | A1 | 8/2010 | Hodson et al. |
| 2011/0022448 | A1 | 1/2011 | Strock et al. |
| 2011/0035379 | A1 | 2/2011 | Chen et al. |
| 2011/0060998 | A1* | 3/2011 | Schwartz ............ G06F 16/954 715/738 |
| 2011/0106605 | A1 | 5/2011 | Malik et al. |
| 2011/0167456 | A1 | 7/2011 | Kokenos et al. |
| 2011/0173097 | A1 | 7/2011 | McKee |
| 2011/0191181 | A1* | 8/2011 | Blackhurst ......... G06Q 30/0255 705/14.53 |
| 2011/0191310 | A1 | 8/2011 | Liao et al. |
| 2012/0078731 | A1 | 3/2012 | Linevsky et al. |
| 2012/0158705 | A1 | 6/2012 | Konig et al. |
| 2012/0166268 | A1 | 6/2012 | Griffiths |
| 2012/0197700 | A1 | 8/2012 | Kalin |
| 2012/0197753 | A1 | 8/2012 | Kalin |
| 2012/0203632 | A1 | 8/2012 | Blum et al. |
| 2012/0271691 | A1 | 10/2012 | Hammad et al. |
| 2012/0311509 | A1 | 12/2012 | Maggiotto et al. |
| 2013/0006803 | A1 | 1/2013 | Oskolkov et al. |
| 2013/0024282 | A1 | 1/2013 | Kansal et al. |
| 2013/0030853 | A1 | 1/2013 | Agarwal et al. |
| 2013/0046621 | A1 | 2/2013 | Asseoff et al. |
| 2013/0073356 | A1 | 3/2013 | Cooper et al. |
| 2013/0144706 | A1 | 6/2013 | Qawami et al. |
| 2013/0173364 | A1 | 7/2013 | Choong et al. |
| 2013/0179303 | A1 | 7/2013 | Petrou et al. |
| 2013/0185125 | A1 | 7/2013 | Celorio-Martinez et al. |
| 2013/0204748 | A1 | 8/2013 | Sugiura |
| 2013/0246199 | A1 | 9/2013 | Carlson |
| 2013/0304563 | A1 | 11/2013 | Haupt et al. |
| 2013/0346221 | A1 | 12/2013 | Rangachari et al. |
| 2014/0006165 | A1 | 1/2014 | Grigg et al. |
| 2014/0100929 | A1 | 4/2014 | Burgess et al. |
| 2014/0122203 | A1 | 5/2014 | Johnson et al. |
| 2014/0129308 | A1 | 5/2014 | Rappoport |
| 2014/0172536 | A1 | 6/2014 | Korzenko et al. |
| 2014/0200997 | A1 | 7/2014 | Anderson |
| 2014/0207551 | A1 | 7/2014 | Van Der Spoel |
| 2014/0214508 | A1 | 7/2014 | Lee |
| 2014/0279214 | A1* | 9/2014 | Wagoner-Edwards ..................... G06Q 30/0633 705/26.8 |
| 2014/0372193 | A1 | 12/2014 | Jorgensen et al. |
| 2015/0032522 | A1 | 1/2015 | Dintenfass et al. |
| 2015/0032538 | A1 | 1/2015 | Calman et al. |
| 2015/0032602 | A1 | 1/2015 | Blackhurst et al. |
| 2015/0039481 | A1 | 2/2015 | Els et al. |
| 2015/0088607 | A1 | 3/2015 | Georgoff et al. |
| 2015/0112774 | A1 | 4/2015 | Georgoff et al. |
| 2015/0112836 | A1 | 4/2015 | Godsey et al. |
| 2015/0178820 | A1* | 6/2015 | Green ............... G06Q 30/0621 705/27.1 |
| 2015/0220979 | A1 | 8/2015 | Ouimet et al. |
| 2015/0302424 | A1 | 10/2015 | Akbarpour et al. |
| 2015/0310468 | A1 | 10/2015 | Mesaros |
| 2015/0347595 | A1 | 12/2015 | Norman et al. |
| 2015/0348140 | A1 | 12/2015 | Campbell |
| 2016/0110762 | A1 | 4/2016 | Mastierov et al. |
| 2016/0140610 | A1 | 5/2016 | McDonough |
| 2017/0039583 | A1 | 2/2017 | Aissa |
| 2018/0089692 | A1 | 3/2018 | Johnson et al. |

FOREIGN PATENT DOCUMENTS

| | | |
|---|---|---|
| JP | 11-134408 | 5/1999 |
| JP | 2000-163480 | 6/2000 |
| JP | 2001-109742 | 4/2001 |
| JP | 2002-063431 | 2/2002 |
| JP | 2002-245366 | 8/2002 |
| JP | 2002-259792 | 9/2002 |
| JP | 2002-312608 | 10/2002 |
| JP | 2008-040753 | 2/2008 |
| JP | 2012-093953 | 5/2012 |
| JP | 2013-218697 | 10/2013 |
| JP | 2015-082134 | 4/2015 |
| KR | 1020010077123 | 8/2001 |
| KR | 1020090008777 | 1/2009 |
| KR | 1020100099843 | 9/2010 |
| KR | 1020110055182 | 5/2011 |
| KR | 1020110120241 | 11/2011 |

(56) References Cited

FOREIGN PATENT DOCUMENTS

| RU | 2428741 | 9/2011 |
|---|---|---|
| WO | 2012074919 | 6/2012 |
| WO | 2012103462 | 8/2012 |
| WO | 2012165033 | 12/2012 |

OTHER PUBLICATIONS

Amazon, "Creating a Wish List", available Feb. 25, 2011, retrieved May 29, 2014, http://www.amazon.com/gp/help/customer/display.html?ie=UTF8&nodeId=501088.

Bajaj, "Shopping for Diwali? Here's how you can crack the best online deals", Oct. 20, 2016, pp. 1-3.

Impulse, "Save your favorite products on an impulse. Buy them when you're ready", retrieved Oct. 23, 2016, pp. 1-2.

Keepa, "Features", retrieved Oct. 23, 2016, p. 1-1.

Owen et al., "Going Beyond Redemption: Closing the Loop with Card-Linked Offers", Jul. 12, 2012, pp. 1-8.

Shoptagr, "When you discover something you want, save it to Shoptagr", retrieved Oct. 23, 2016, p. 1-1.

Taggr, "Wish List any Store & Price Watch", retrieved Oct. 23, 2016, p. 1-1.

Ziftr Alerts, "You do the shopping. We'll do the searching. It's that simple", retrieved Oct. 23, 2016, pp. 1-2.

Wishlist, "Extension for Wishlist App", retrieved Oct. 23, 2016, p. 1-1.

Wishtack, "Gift Ideas & Wishlist", retrieved Oct. 23, 2016, p. 1-1.

Word Press, "Status Tracking", retrieved Oct. 25, 2016, pp. 1-4.

Nakamura, "Out-of-Browser" Function Supported Outside the Web Browser, Oct. 1, 2009, vol. 94, p. 154-155.

Office Action in Canadian Application No. 3,039,539 dated Dec. 31, 2020.

\* cited by examiner

In response to a user loading a product webpage into a web browser, the browser extension calculates a "fully-stacked price" for the product on the webpage. The fully-stacked price is the effect cost for purchasing the product after shipping charges, a coupon discount, a cashback reward, and any other applicable reward are applied to the web price.
110

Browser extension enables user to open a user interface within the user's web browser for adding the product to a wish list
120

In response to the user opening the user interface for adding the product to a wish list, the browser extension renders the user interface within the web browser and displays, within the user interface, the initial fully-stacked price, product summary information, and buttons/UI elements for adding the product to a wish list.
130

In response to the user adding the product to the wish list, storing the initial fully-stacked price and product information in a backend database
140

While the product is in the wish list, back end server continues to track the fully-stacked price for the product, which includes monitoring the current web price, shipping charges, coupon discount, and reward amount associated with purchase of the product.
150

In response to a drop in the fully-stacked price for the product (as compared to the initial fully-stacked price) browser extension notifies the user of the FSP drop in the browser window
160

Browser extension provides a user interface for viewing wish list contents within browser extension, including notifications of drops in FSPs.
170

SYSTEM, METHOD, AND COMPUTER PROGRAM FOR PROVIDING A WISH LIST USER INTERFACE WITHIN A WEB BROWSER THAT ALERTS USERS TO CHANGES IN MULTIFACTOR-BASED PRICES

RELATED APPLICATIONS

This application claims the benefit of U.S. Provisional Application No. 62/407,962, filed on Oct. 13, 2016, and titled "Browser Extension for Wish List that Displays Fully-Stacked Prices and Alerts Users to Drops in Fully-Stacked Prices," the contents of which are incorporated by reference herein as if fully disclosed herein.

BACKGROUND OF THE INVENTION

1. Field of the Invention

This invention relates generally to ecommerce systems, and, more specifically, to a system that provides a wish list user interface within a web browser and that alerts users to changes in the net price of products based on multiple factors (i.e., web price, coupons, shipping charges, and rewards).

2. Description of the Background Art

Website-based wish lists provide a convenient way for ecommerce users to keep track of products in which they are interested, but not ready to immediately purchase. Users can add products to a wish list and then later go back and purchase items in the wish list.

Cashback shopping portals, such as EBATES, provide cashback rewards for users who purchase products. The cashback reward is typically a percentage of the purchase price, wherein the percentage varies based on what merchant is willing to offer. Therefore, for users of such portals, the effective cost of a product depends on the web price and the cashback amount, as well any shipping charges and coupon discounts. For example, the web price of a product could stay the same, but the effective cost to a consumer could decrease if the cashback reward increases.

Existing wish lists list only the web price of a product. There is demand for wish list functionality that alerts user to a drop in the effective cost of a product based on the web price, cashback reward, coupon discount, and shipping charges.

SUMMARY OF THE DISCLOSURE

This disclosure relates to system, method, and computer program for providing a wish-list user interface within a web browser, for tracking "fully-stacked prices" for items in the wish list, and for alerting users to a drop in a fully-stacked price of an item in the wish list. In one embodiment, the method is performed by a computer system comprising a backend server and a client device executing a web browser with a browser extension.

In response to a user loading a product page into the web browser, a browser extension for the wish list calculates a "fully-stacked price" for the product on the webpage. A "fully stacked price" or "FSP" for a product is the user's net cost to purchase the product (excluding taxes) after applying shipping charges, any applicable coupon discount, a cashback reward, and any other applicable reward to the web price.

The browser extension enables a user to open a user interface within a user's web browser for adding a product on a product webpage to a wish list. In one embodiment, when the browser extension detects a user is on a product page, the user browser extension inserts a "call-to-action" overlay on the webpage, which, when clicked, opens the user interface for adding a product to a wish list.

When the user opens the user interface for adding a product to a wish list, the browser extension renders the user interface as a temporary overlay on a portion of the product webpage. Within the user interface, the browser extension displays the initial fully-stacked price for the product, product summary information extracted from the product page, and buttons that enable a user to add the product to one or more wish lists In response to a user adding the product to a wish list, the browser extension sends the product information and the initial fully-stacked price to a backend server, which stores the information in a backend database for wish list data. While the product remains in the wish list, a backend server continues to track the fully-stacked price for the product. In one embodiment, for each item in a user's wish list, the server periodically checks the web price, coupons available for use in purchasing the item, cashback amount applicable to the item (and any other reward applicable to the item), and the shipping charge, and then recalculates the fully-stacked price for the item.

In response to the fully-stacked price dropping for an item in the wish list (as compared to the initial FSP), the server notifies the browser extension, which alerts the user to the price drop in the wish-list user interface. From within the web browser, the browser extension also enables a user to open and view a user interface that displays wish list contents. The user interface is opened without navigating away from the current page in the web browser. The wish-list user interface may indicate the reason for the price drop, namely whether the decrease is due to a drop in the base price of the product, an increase in the cashback reward or other reward, the application of a new coupon, and/or a drop in the shipping charge. The wish list user interface does not affect the content of the webpage viewed in the web browser and is viewable by the user at any time the browser is open (regardless of the current content in the browser).

BRIEF DESCRIPTION OF THE DRAWINGS

FIG. 1 is a flowchart that illustrates a method, according to one embodiment, for providing a browser-based wish list that displays fully-stacked prices and alerts users to drops in fully-stacked prices for products from different merchants.

FIGS. 5A-5D are screen shots that illustrate an example of the methods described herein.

DETAILED DESCRIPTION OF THE PREFERRED EMBODIMENTS

Figure 2A:
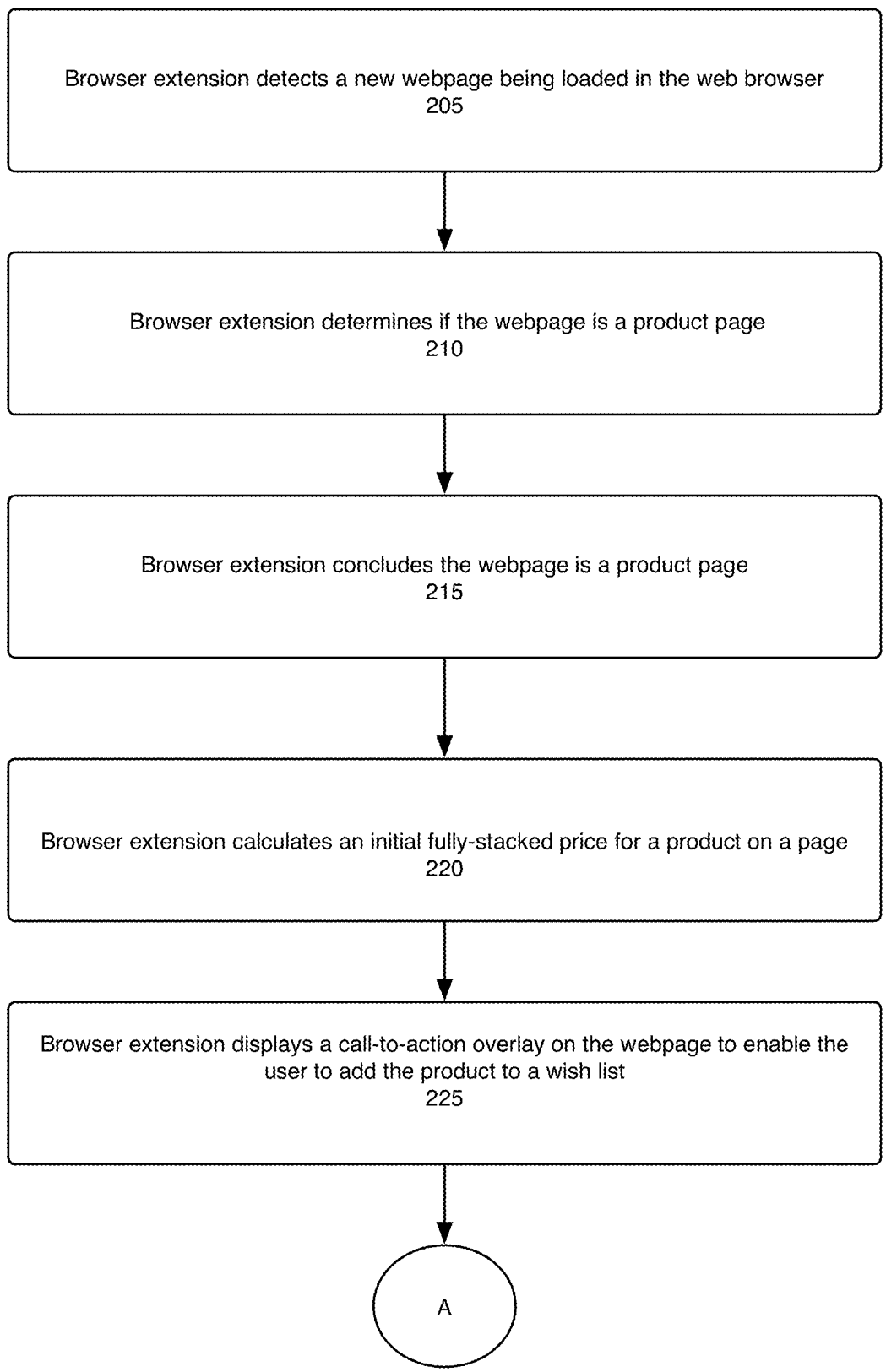
FIG. 2A-2C are flowcharts that illustrate an example implementation of the method of FIG. 1.

This disclosure relates to system, method, and computer program for providing a wish list user interface within a web browser, for tracking fully-stacked prices for items in the wish list, and for alerting users to a drop in a fully-stacked price of an item in the wish list. In one embodiment, the method is performed by a computer system comprising a backend server and a client device executing a web browser with a browser extension.

As used herein, the term "browser extension" applies to any software code that executes within the context of a web browser and extends the normal functionality of a browser, including, but not limited to browser extensions and browser add-ons. As stated above, a "fully stacked price" or "FSP" for a product is the net cost (excluding taxes) of the product after applying shipping charges, any applicable coupon discount, a cashback reward, and any other applicable reward to the web price. A "product" may be a physical product or a service.

Referring to FIG. 1, in response to a user loading a product page into the web browser, a browser extension for the wish list calculates an initial fully-stacked price for the product on the webpage (step 110). In one embodiment, the web price is obtained from the webpage, and the reward amount(s), coupon discount, and shipping information are obtained from backend data sources, as discussed in more detail with respect to FIGS. 2 and 3.

The browser extension enables a user to open a user interface within a user's web browser for adding a product on a product webpage to a wish list. (step 120). In one embodiment, the browser extension may place a call-to-action overlay on a product image on a product page, where a user can click on the call-to-action overlay to open a user interface screen that enables the user to add the product to the wish list (e.g., see FIG. 5A for example call-to-action overlay). Steps 110 and 120 may be performed in parallel.

Figure 5B:
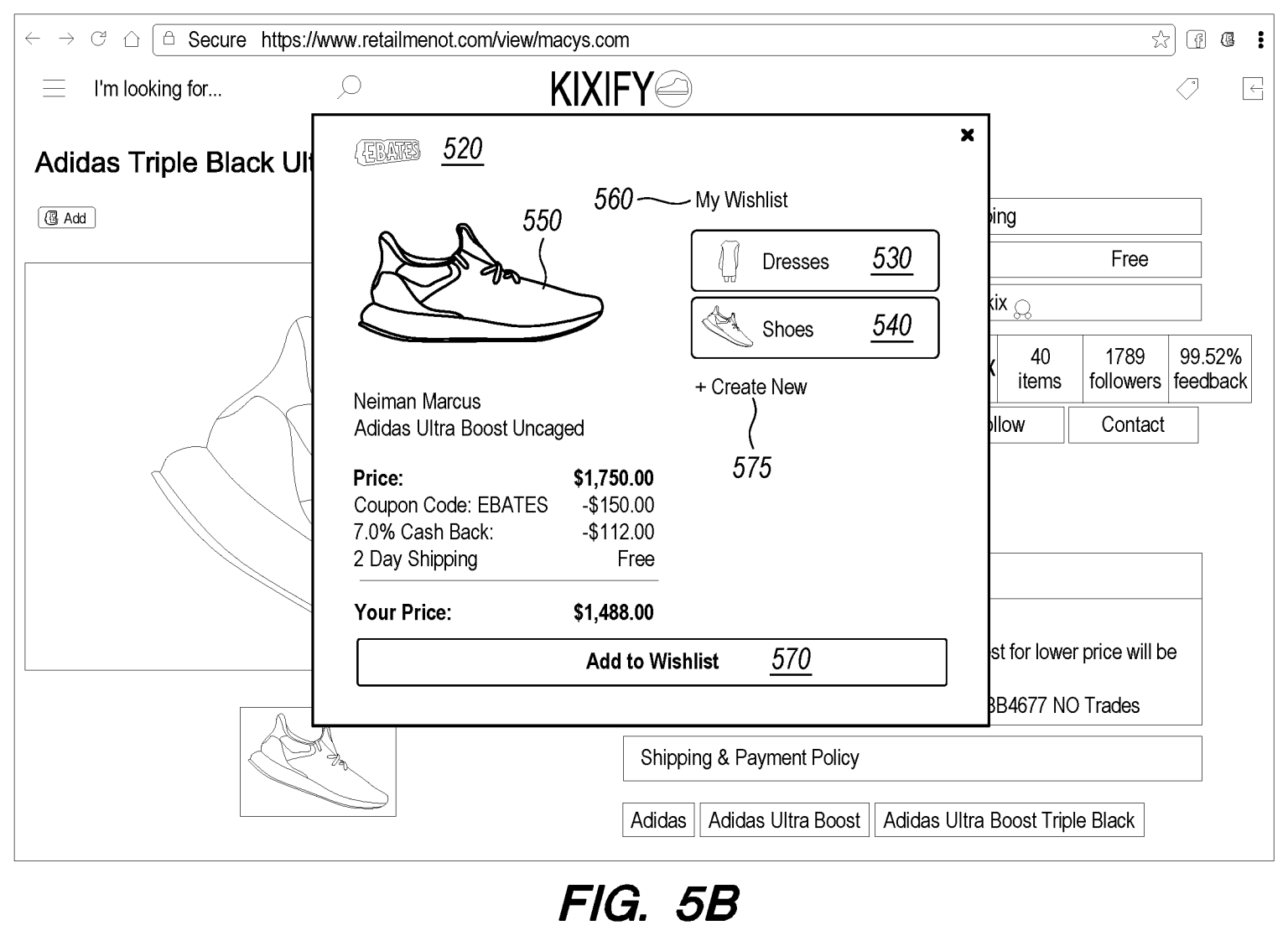

When the user opens the user interface for adding a product to a wish list, the browser extension renders the user interface as a temporary overlay on a portion of the product webpage. Rendering the user interface neither affects the content of the webpage viewed in the web browser, nor requires the user to navigate to another page. Within the user interface, the browser extension displays the initial fully-stacked price for the product, product summary information extracted from the product page, and buttons that enable a user to add the product to one or more wish lists (step 130). FIG. 5B illustrates an example of this interface. The user may add products from multiple, unrelated merchants to a wish list (i.e., the browser extension works with multiple, unrelated merchant websites).

In response to a user adding the product to a wish list, the browser extension sends the product information and the initial fully-stacked price to backend sever (along with a unique identifier associated with the user), which stores the information in a backend database for wish list data (step 140). While the product remains in the wish list, a backend server continues to track the fully-stacked price for the product (step 150). In one embodiment, for each item in a user's wish list, the server periodically checks the web price, coupons available for use in purchasing the item, reward amount applicable to the item (i.e., cashback reward and any other applicable reward), and the shipping charge and then recalculates the fully-stacked price for the item.

In response to the fully-stacked price dropping for an item in the wish list (as compared to the initial FSP), the server notifies the browser extension, which alerts the user to the price drop in the wish-list user interface (step 160). For example, the browser extension may display a browser notification with the FSP price drop.

From within the web browser, the browser extension also enables a user to open and view a user interface that displays wish list contents (step 170). The wish-list user interface may indicate the reason for the price drop, namely whether the decrease is due to a drop in the base price of the product, an increase in the cashback reward, the application of a new coupon, and/or a drop in the shipping charge. If there is are further subsequent FSP drops, the browser extension provides further alerts to the user.

Figure 5C:
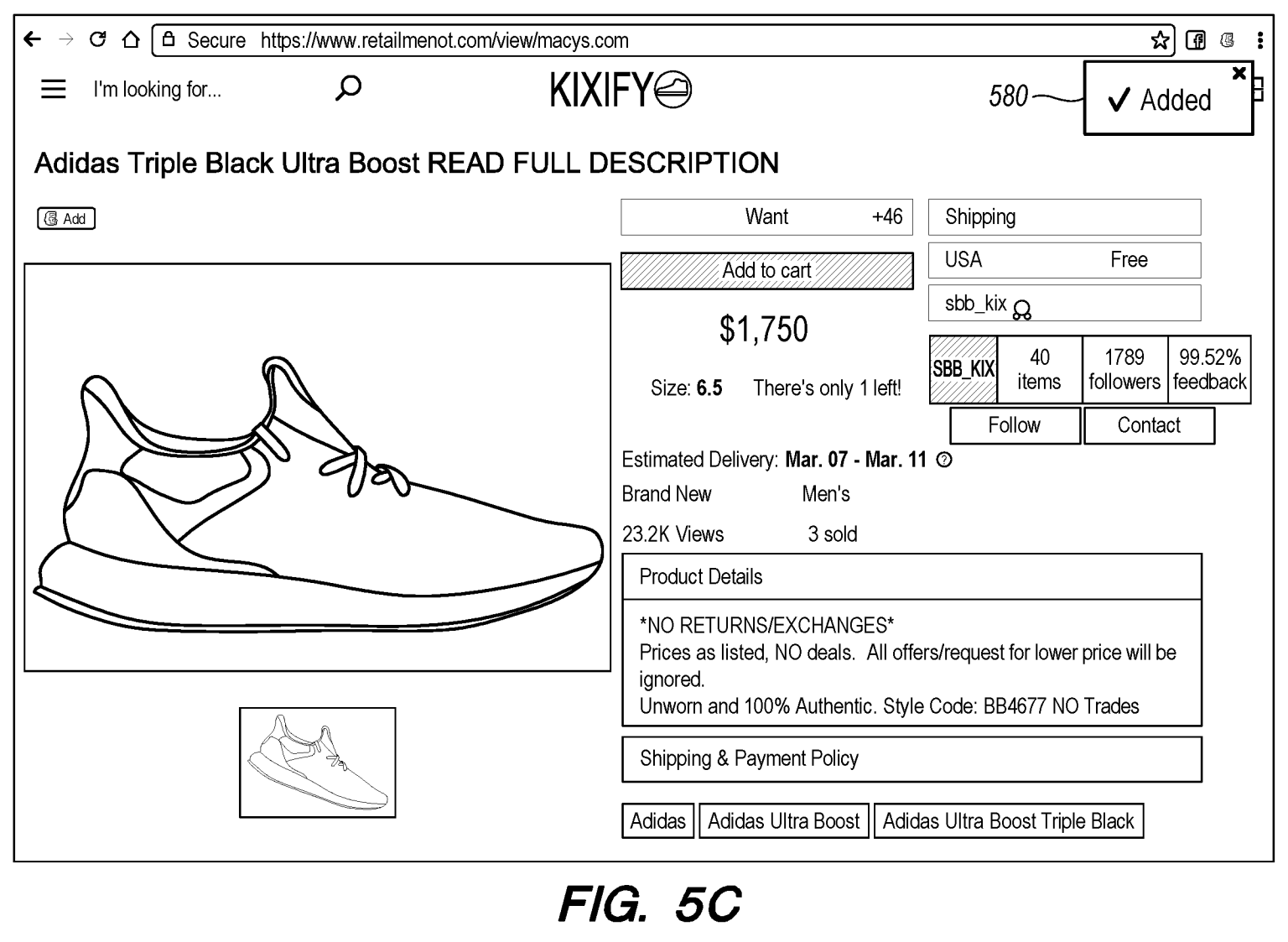
Figure 5D:
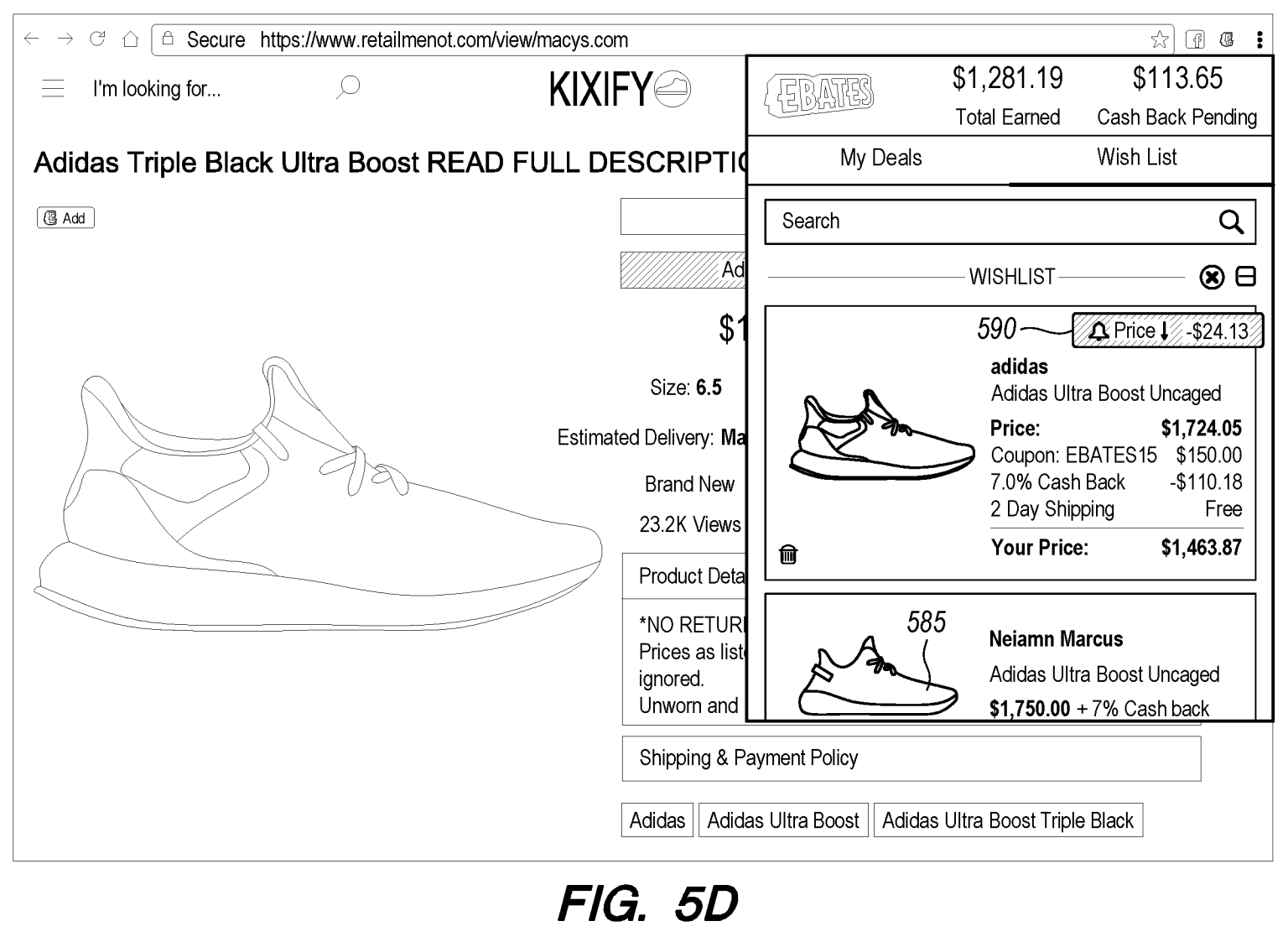

In one embodiment, the wish list is viewable by the user at any time the browser is open (regardless of the current content in the browser). In one embodiment, the user opens the browser extension the user interface for viewing the wish list by clicking on or hovering over a designated button for the browser extension in the web browser's menu or navigation bar. When opened, the user interface overlays a portion of the webpage displayed in the web browser. As discussed in more detail below, the modal window in FIG. 5D illustrate an example of such an interface. The user can close the user interface to continue viewing the page displayed within the web browser.

Figure 2B:
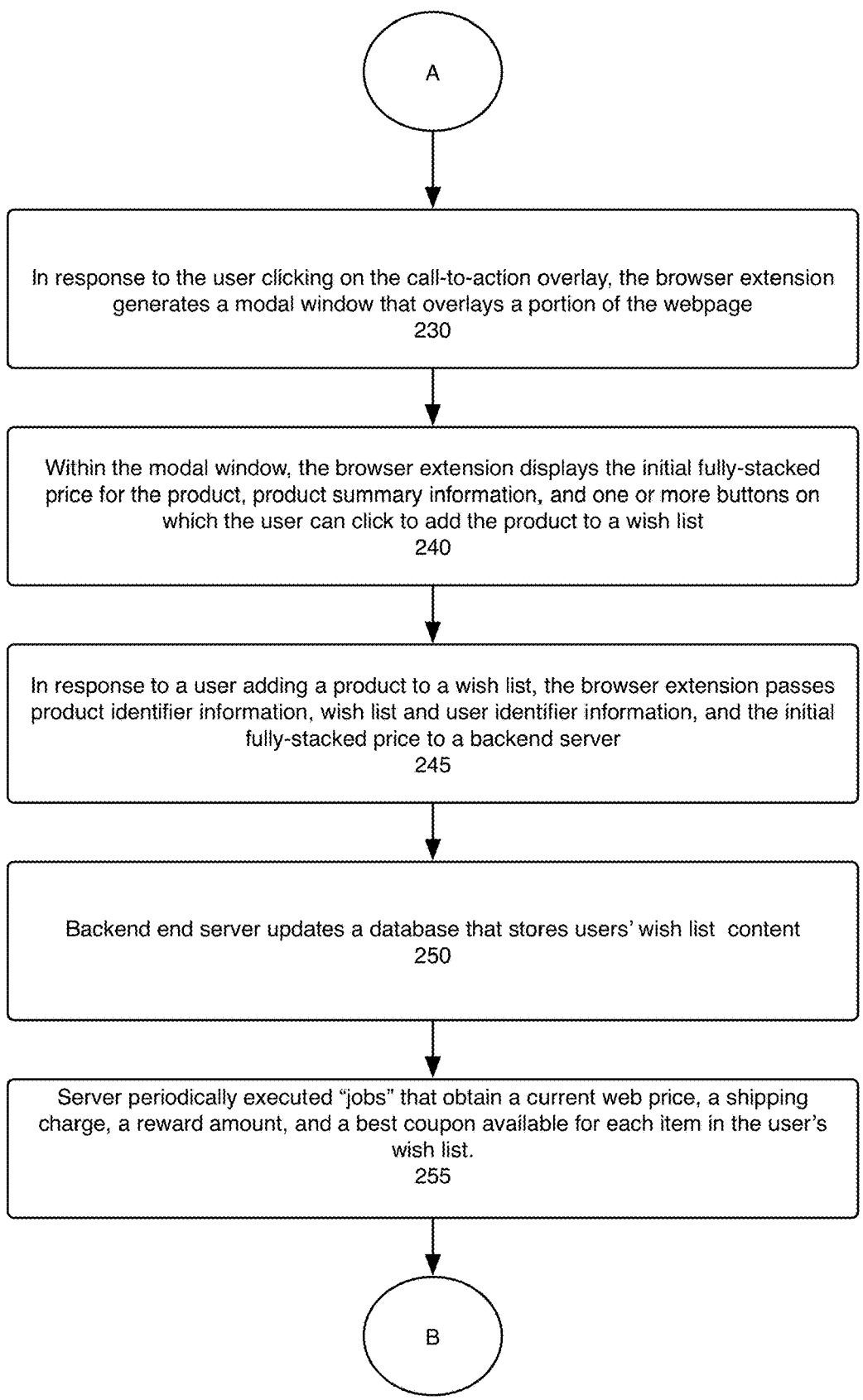
Figure 2C:
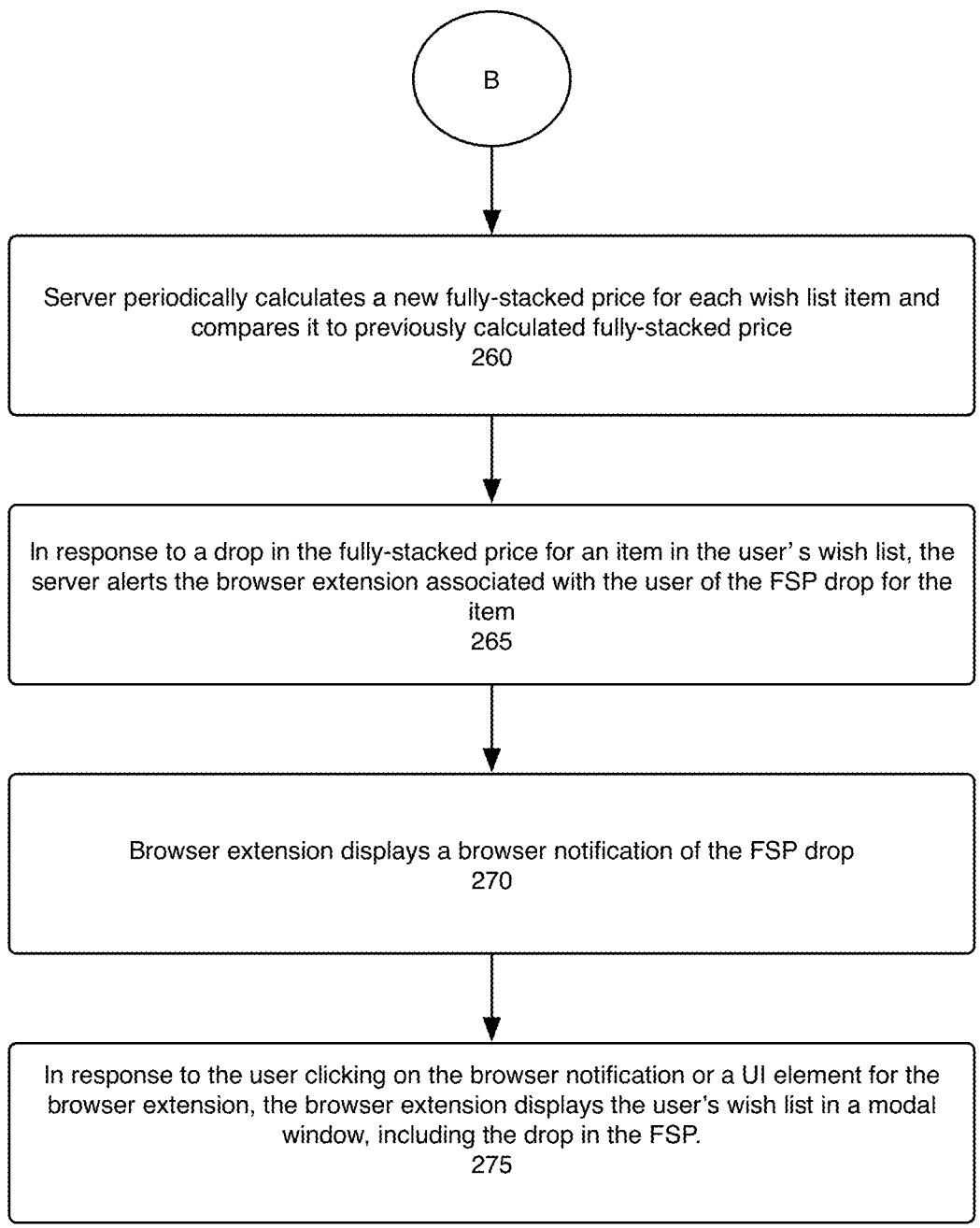

FIG. 2 illustrates an example implementation of the above method. In response to the browser extension detecting a new webpage being loaded in the browser (step 205), the browser extension determines if the webpage is a product page (step 210). A product page is a page on which a user can add a product to a website shopping cart. In one embodiment, the browser determines whether the webpage is a product page by performing the following:

a. Comparing the website domain to a list of merchant domains to ascertain whether the website is a known merchant site.
b. Parsing the webpage for metadata values and determining whether the webpage includes a minimum number of metadata values that are unique to a product, such as "price," "shipping," "size," etc. In one embodiment, machine learning is used to identify metadata values associated with a product page.
c. Parsing the webpage to determine whether the webpage includes a button for adding an item to a cart; and
d. Identifying the largest image on the webpage and determining whether the largest image exceeds a threshold size.

If all the above determinations evaluate to true with a threshold confidence level (e.g., 90%), the browser extension concludes the webpage is a product page.

If the browser extension cannot identify the webpage as a product page, it does nothing further with respect to the wish list. If it concludes that the webpage is a product page, the browser extension calculates a fully-stacked price for a product on the page (steps 215, 220). In one embodiment, the browser extension obtains the fully-stacked price as follows:

a. The browser extension looks up merchant ID from a mapping of URLs to merchant IDs.
b. Using the merchant ID, the browser extension sends a request, via an API, to a coupon data source, a shipping data source, and a reward data source for coupon information, reward information (i.e., cashback reward and any other applicable reward), and shipping information related to the merchant. This information enables the browser extension to identify any coupons that apply to the product, any shipping charges associated with purchasing the product from the website, and any cashback reward amount associated with the merchant. The coupon information received includes coupon properties that define to which items a coupon applies (e.g., "sitewide," "over 100," "handbags'). For each coupon received, the browser extension compares the scraped product information from the website to the coupon properties to determine if the coupon is applicable. If more than one coupon is applicable, the browser extension selects the coupon that provides the greatest discount.

c. The browser extension extracts the web price for the product from the webpage (e.g., by parsing/scraping the webpage).

d. Browser extension calculates the fully-stacked price by adding the web price and the shipping cost, and then subtracting any applicable coupon discount and reward(s) that would be earned by purchasing the product (after any applicable coupon discount has been applied). An example of a reward other than a cashback award that may be used to calculate the FSP is a "bonus" award in which users earn future store credit in exchange for a purchase. For example, if a user A spends $10 at Merchant B, Merchant B gives user A a $5 store credit for future purchases. If there is no coupon and if the cashback amount is 2%, then the total reward amount in this example is $2 (0.02×$10) plus $5=$7. Thus, in calculating the FSP, $7 would be subtracted from the web price.

The browser extension then displays a call-to-action overlay on the webpage to enable the user to add the product to a wish list (step 225). The call-to-action overlay is a clickable icon or other UI element added to the webpage by the browser extension (i.e., it is not part of the original webpage content.) The "E Add" icon 510 in FIG. 5A is an example of a call-to-action overlay. In one embodiment, the browser extension identifies the largest image on the webpage and places the call-to-action overlay over the largest image.

In response to the user clicking on the call-to-action overlay, browser extension generates a modal window that overlays a portion of the webpage (step 230). Within the modal window, the browser extension displays the fully-stacked price calculated for the product on the webpage, product summary information automatically scraped/parsed from the webpage (e.g., the largest image from the webpage and the product title), and one or more one or more buttons on which the user can click to add the product to a wish list (step 240).

In certain embodiments, there may be a single, generic wish list. In other embodiments, the user may be able to create or select from sub-wish lists in different categories in addition to having a generic wish list. FIG. 5B illustrates an example of the modal window 520 generated by the browser in response to the user clicking on the "E Add" call-to-action overlay 510 in FIG. 5A. In this example, the user has previously created wish lists for "dresses" and "shoes," corresponding to buttons 530, 540 (effectively, a menu of the user's wish lists). At the time window 520 is displayed, the product (i.e., the illustrated shoes) has not yet been added to a wish list. To add the illustrated shoe 550 to the "shoe" wish list, a user select the "shoe" button 540 from the "My Wishlists" menu 560 and then clicks on the "Add to Wish List" button 570. To create a new sub-wish list, the user selects the "Create New" button 575. To add the product to the generic wish list, the user selects button 570 without selecting a sub-wish list in the "My Wishlists" menu 560. FIG. 5C illustrates an "Added" notification 580 displayed after a user has added a product to a wish list.

Each wish list and sub-wish list is associated with a unique wishlist ID. When the user creates a new wish list, the browser extension requests a new wishlist ID for the new wish list from a server that manages user wish lists.

In response to a user adding the product to a wish list, the browser extension passes product and wish list information to a backend server that tracks fully-stacked prices for items in wish lists ("the server") (step 245). In one embodiment, the information sent includes a user ID that uniquely identifies the user; a wishlist ID; a sub-wishlist ID (if the user has added the product to a sub-wish list); the URL of the webpage from which the product was added to the wish list; the initial FSP for the product, the applicable cashback reward, shipping, and coupon information obtained by the browser extension; the merchant ID; and the following information parsed/scraped from the webpage: the product image (i.e., largest image from the webpage), product title, product price, currency, product description, and product SKU. The backend server updates a database that stores users' wish list contents with the new wish list item (step 250).

The server periodically (e.g., daily) executes "jobs" that obtain from one or more relevant data sources the following for each item in each user's wish list(s): a current web price, a shipping charge associated with the purchase of the product on the website, one or more rewards available for use in purchasing the product on the website (including a cashback reward), and a best coupon available for use in purchasing the product on the website (step 255). Based on the most recent web price, best applicable coupon, shipping charge, and reward amount(s) obtained by the jobs executing on the server, the server periodically calculates a new fully-stacked price for each wish list item and compares it to previously calculated fully-stacked price for the item (step 260).

In response to a drop in the FSP for an item in a user's wish list, the server alerts the browser extension associated with the user to a drop in the fully-stacked price (step 265). In one embodiment, browser extensions register for push notifications, and a push notification is sent to the applicable browser extension.

Figure 6:
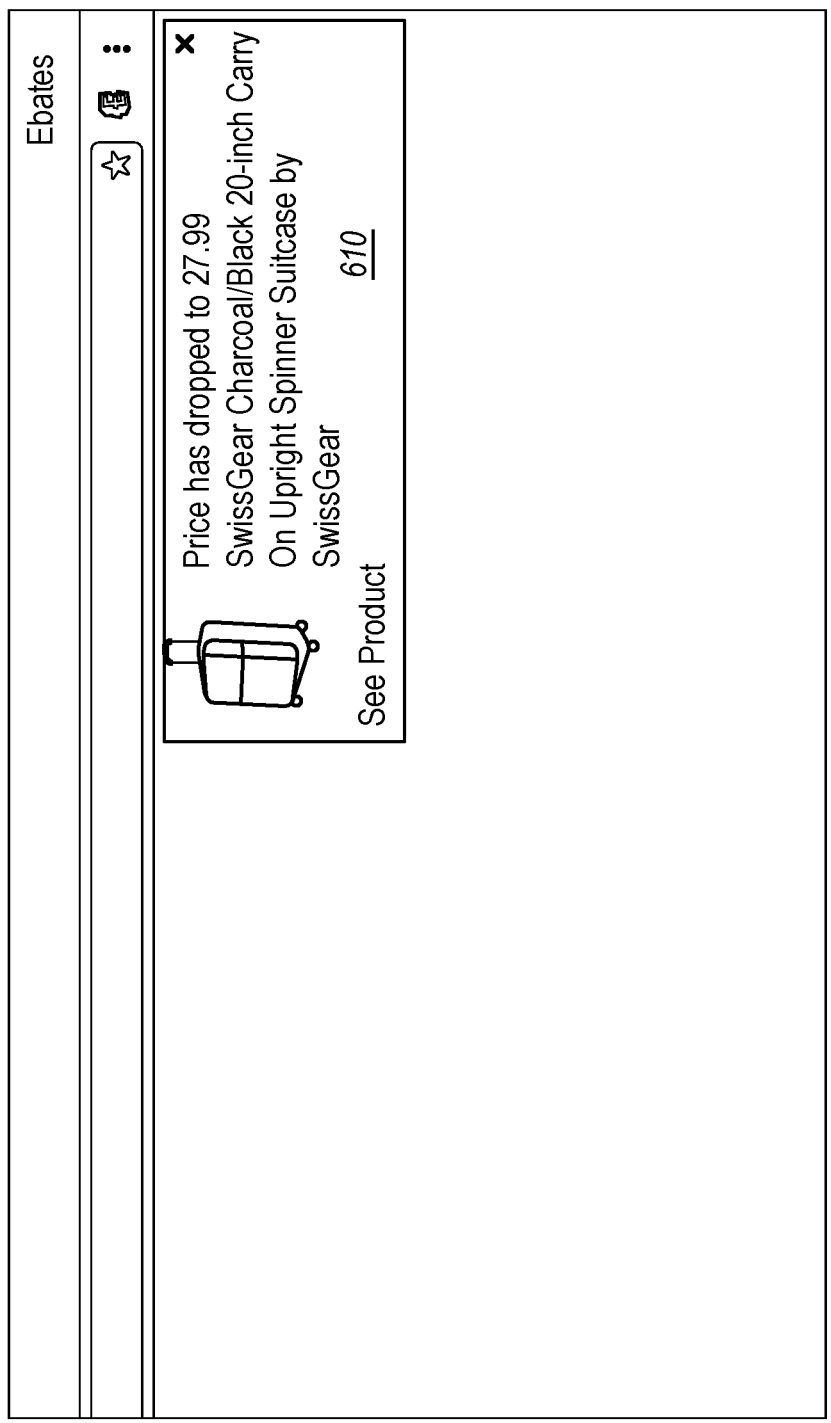
FIG. 6 is a screen shot that illustrates a browser notification

In response to receiving the push notification (or other alert), the browser extension displays a browser notification of the FSP drop (step 270). FIG. 6 illustrates an example of a browser notification 610. When the user clicks on the browser notification or a UI element for the browser extension (e.g., button, icon, etc.), the browser extension displays the user's wish list(s) in a modal window within the web browser (e.g., modal window 585 in FIG. 5D), including displaying the drop in the FSP for the applicable item (step 275). In one embodiment, the amount in which the FSP changed (from the initial FSP) is highlighted within the wish list. For example, in FIG. 5D, a $24.13 drop in FSP for a shoe is highlighted (see 590).

In certain embodiments, the user can initiate purchase of the product through the wish list via a universal shopping cart associated with the wish list. An example of a universal shopping cart is described in U.S. patent application Ser. No. 13/666,134 filed on Nov. 1, 2012, the contents of which are incorporated herein by reference. In other embodiments, when the user clicks on an item in the wish list, the user is taken to the product page from which the item was added to the wish list. In yet other embodiments, each item in the wish list is associated with a "buy" button that, when selected, adds the item to the applicable merchants shopping cart (i.e., the shopping cart of the website from which the product was added to the wish list).

Figure 3:
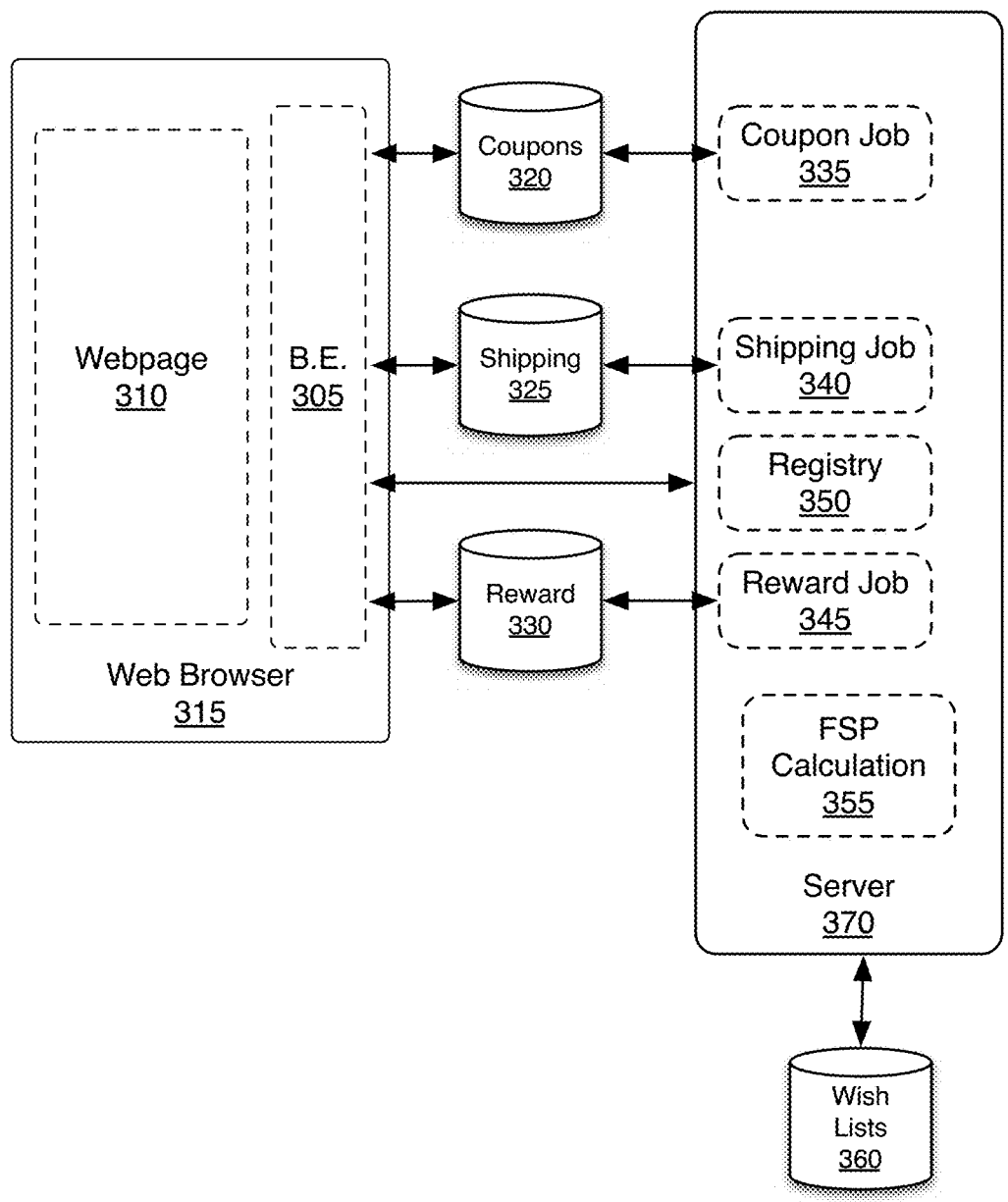
FIG. 3 is a block diagram that illustrates an example system architecture.

FIG. 3 illustrates an example system architecture for implementing the above-described methods. The methods described herein may be implemented in a system configured differently and are not limited to the system architecture illustrated in FIG. 3. A browser extension 305 executes within a web browser 315 on a user's client device. In response to detecting that a product page 310 has been loaded into web browser 315, the browser extension 305 makes an API call to coupon data source 320, a reward data source 330, and shipping data source 325 to obtain any applicable coupon discount, reward amount (e.g., cashback amount), and shipping cost associated with purchasing the product on the webpage 310. The browser extension 305 parses the webpage 310 within the web browser 315 to obtain the web price, title, and image for the product.

In response to a user adding a product to a wish list, the browser extension 305 notifies server 370, and the server 370 updates the user's wish list information in wish list database 360. The server 370 includes job modules 335, 340, and 345, which periodically also make API calls to coupon data source 320, shipping source 325, and reward data source 330, respectively, to obtain any applicable coupon discount, reward amount (e.g., cashback amount), and shipping costs for each product in the wish list database 360. The data sources 320, 325, and 330 may be populated manually or via service that automatically feeds data into these data sources A FSP module 355 periodically calculates the FSP for each product in the wish list database 360 and compares it to the previously-calculated FSP. The server 370 includes a push notification registry 350 to enable browser extensions to register for push notifications, which are sent in response to detecting drops in FSPs.

Figure 4:
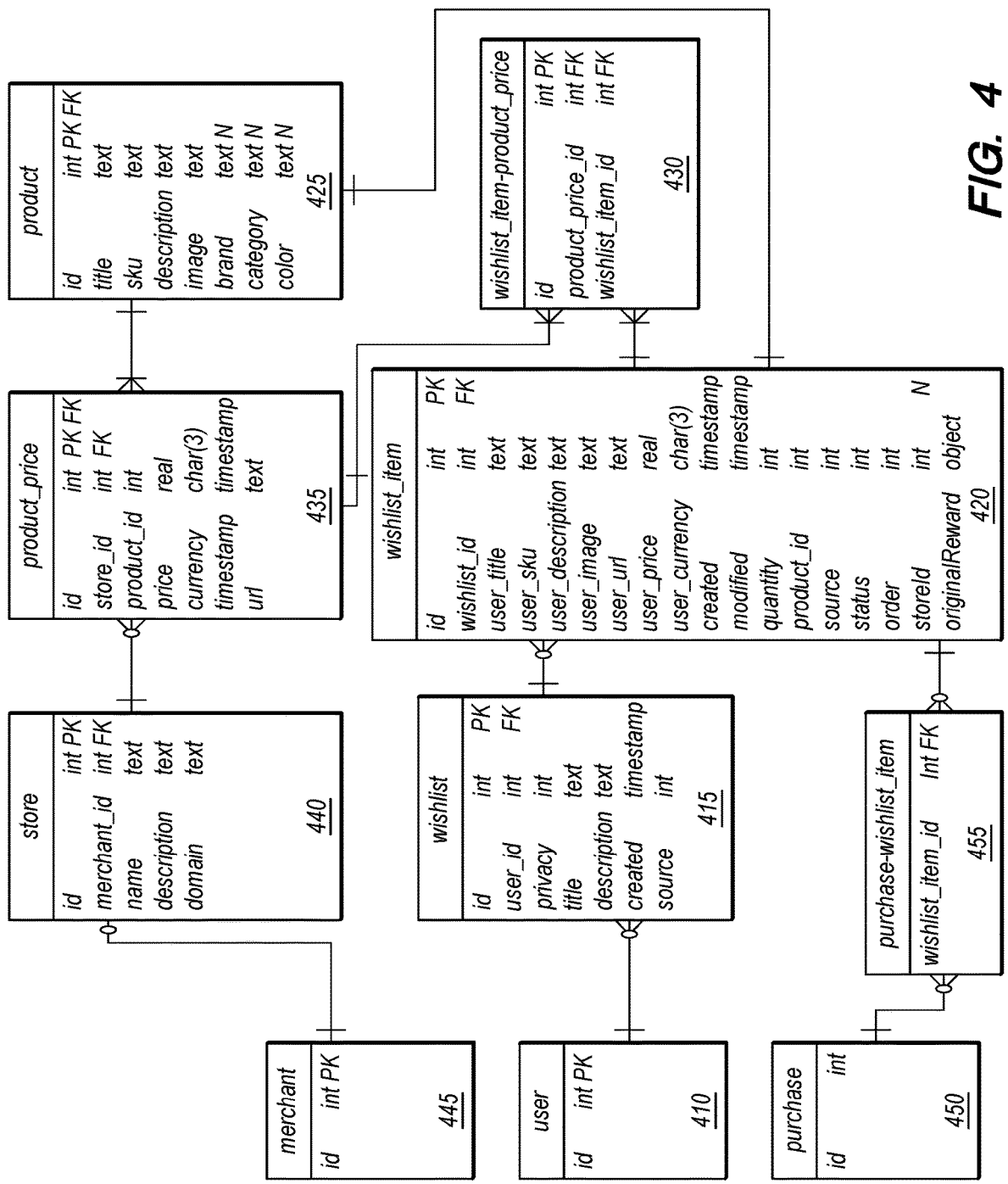
FIG. 4 is a block diagram that illustrates an example of how to efficiently store wish list information.

FIG. 4 illustrates an example architecture for efficiently storing the wish lists. The methods described herein may be implemented in a database configured differently and are not limited to the database architecture illustrated in FIG. 4. Each user object 410 in the database is associated with one or more wish list objects 415, and each wish list object is associated with one or more wish list item objects 420. As shown each wish list object 415 includes a unique wishlists ID, the user ID of the user who owns the wish list, the privacy setting (e.g., public, private), the title, date create, and the browser extension source for the wish list. Each wish list item object 420 includes information about the product in the wish list. The values for entries beginning with "user_" are parsed from the applicable webpage by the browser extension. Each wish list item object 420 is associated with a FSP price object 430 and with a corresponding product object 425. The product object 425 is associated with a product price object 435 (i.e., the web price), store object 440 with information on the applicable website, and merchant object 445 associated with the product. Each purchase transaction 450 from the wish list is associated with a wish list item object 420.

The methods described herein are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A method for providing a wish list user interface within a browser that alerts a user to a drop in a fully-stacked price, the method comprising:
   in response to a user loading a product webpage into a web browser, calculating an initial fully-stacked price for a product on the webpage, wherein the fully-stacked price is the cost of the product after applying shipping charges, any coupon discounts, and any cashback rewards or other applicable rewards to a web price of the product;
   enabling, by the browser extension, the user to open a first user interface within the user's web browser for adding the product to a wish list;
   in response to the user opening the first user interface for adding the product to a wish list, rendering, by the browser extension, the first user interface within the web browser as a temporary overlay on a portion of the webpage and displaying in the first user interface the following: the initial fully-stacked price, product summary information, and one or more buttons to add the product to a wish list;
   in response to the user adding the product to the wish list, storing the initial fully-stacked price and product information in a database;
   continuing, by a backend server, to track a fully-stacked price for the product, including periodically checking for any changes to the web price, shipping charges, coupon discounts, and cashback rewards or other applicable rewards, and periodically recalculating the fully-stacked price for the product to include any such changes, wherein a fully-stacked price is tracked for each item added to the wish list;
   in response to identifying a drop in the fully-stacked price for the product as compared to the initial fully-stacked price, notifying, by the browser extension, the user of the drop in the fully-stacked price; and
   providing, by the browser extension, a second wish list user interface within a user's web browser, wherein the wish list contents are displayed in the second user interface, including the fully-stacked price for each item added to the wish list and an indication of a drop in the fully-stacked price for the product, wherein display of the second user interface does not affect the content of the webpage viewed within the web browser.

2. The method of claim 1, wherein, in indicating the fully-stacked price drop, the second user interface indicates whether the price drop is due to a decrease in the website price, decrease in the shipping cost, an increase in a reward, and/or the application of a new coupon.

3. The method of claim 1, wherein calculating the fully-stacked price, providing the first user interface, and enabling a user to add products to the wish list comprises:
   detecting, by a browser extension, a new webpage being loaded into a browser;
   identifying, by the browser extension, the webpage as a product page;
   obtaining a fully-stacked price for a product on the webpage based on a price retrieved from the webpage, a shipping charge associated with purchase of the product on the website, a reward available for use in purchasing the product on the website, and a best coupon available for use in purchasing the product on the website;
   displaying, by the browser extension, a clickable call-to-action overlay on the webpage in order to facilitate the user adding the product to the wish list;

in response to the user clicking on the call-to-action overlay, generating, by the browser extension, a modal window that overlays a portion of the webpage and displaying in the modal window, a largest image retrieved from the webpage, a product title retrieved from the webpage, and the fully-stacked price;

from within the modal window, enabling, by the browser extension, a user to select a wish list and add the product associated with the displayed image to the selected wish list; wherein a user is able to add different products from different merchants and webpages to a wish list; and In response to a user adding the product to a wish list, sending information related to the product and the user's wish list from the browser extension to a server, which updates a wish list database.

4. The method of claim 3, further comprising:

periodically executing on the server jobs that obtain from one or more relevant data source the following: a current website price for the product, a shipping charge associated with purchase of the product on the website, a cashback reward available for use in purchasing the product on the website, and a best coupon available for use in purchasing the product on the website;

periodically calculating, by the server, a fully-stacked price for the product and comparing the fully-stacked price to a previously calculated fully-stacked price, wherein the fully-stacked price is calculated from the current web price, shipping charge, best applicable coupon, and cashback reward obtained by the jobs executed by the server;

in response to a drop in the fully-stacked price, alerting the browser extension to a drop in the fully-stacked price for the product;

displaying, by the browser extension, a browser notification of the fully-stacked price drop in the browser; and in response to a user clicking on the browser notification or an icon for the browser extension, displaying, by the browser extension, the second user interface in a modal window, including displaying the drop in the fully-stacked price for the product.

5. The method of claim 4, further comprising enabling the user to purchase the product from within the wish list.

6. The method of claim 4, wherein, in the first user interface, a user can create a new wish list or select from a plurality of wish lists.

7. A method for providing a wish list user interface within a browser that alerts a user to a drop in a fully-stacked price, the method comprising:

detecting, by a browser extension, a new webpage being loaded into a browser;

identifying, by the browser extension, the webpage as a product page;

obtaining, by the browser extension, a fully-stacked price for a product associated with the image based on the price associated with the image, a shipping charge associated with purchase of the product on the website, one or more rewards available for use in purchasing the product on the website, and a best coupon available for use in purchasing the product on the website, wherein the reward(s) available includes a cashback reward;

identifying, by the browser extension, a largest image on the webpage;

displaying, by the browser extension, a clickable call-to-action overlay on the webpage for a period of time;

in response to the user clicking on the call-to-action overlay, generating, by the browser extension, a modal window that overlays a portion of the webpage and displaying in the modal window, the largest image, a product title retrieved from the webpage, and the fully-stacked price;

from within the modal window, enabling, by the browser extension, a user to select a wish list and add the product associated with the displayed image to the selected wish list; wherein a user is able to add different products from different merchants and webpages to a wish list;

in response to a user adding the product to a wish list, sending information related to the product and the user's wish list from the browser extension to a server, which updates a wish list database;

for each item added to the wish list:
periodically executing on the server jobs that obtain from one or more relevant data sources the following: a current website price for the product, a shipping charge associated with purchase of the product on the website, a reward available for use in purchasing the product on the website, and a best coupon available for use in purchasing the product on the website, and periodically calculating, by the server, a fully-stacked price for the product and comparing the fully-stacked price to a previously calculated fully-stacked price, wherein the fully-stacked price is calculated from the current website price, shipping charge, best applicable coupon, and cashback reward obtained by the jobs executed by the server;

in response to a drop in the fully-stacked price for the product, alerting the browser extension to a drop in the fully-stacked price for the product, wherein the alert is sent by the server;

displaying, by the browser extension, a browser notification of the fully-stacked price drop in the browser; and in response to a user clicking on the browser notification or an icon for the browser extension, displaying, by the browser extension, the wish list user interface in a modal window, including displaying the fully-stacked price for each item added to the wish list and the drop in the fully-stacked price for the product.

8. The method of claim 7, further comprising enabling the user to purchase the product from within the wish list.

9. The method of claim 7, wherein, from the modal window, a user can create a new wish list or select from a plurality of wish lists.

10. The method of claim 7, wherein the browser extension determines if the largest image exceeds a threshold size and only proceed with displaying the call-to-action overlay if the largest image exceeds the threshold.

11. A computer system for providing a wish list user interface within a browser that alerts a user to a drop in a fully-stacked price, the system comprising:

one or more processors;

one or more memory units coupled to the one or more processors, wherein the one or more memory units store instructions that, when executed by the one or more processors, cause the system to perform the operations of:

in response to a user loading a product webpage into a web browser, calculating an initial fully-stacked price for a product on the webpage, wherein the fully-stacked price is the cost of the product after applying shipping charges, any coupon discounts, and any cashback rewards or other applicable rewards to a web price of the product;

enabling, by the browser extension, the user to open a first user interface within the user's web browser for adding the product to a wish list;

in response to the user opening the first user interface for adding the product to a wish list, displaying, by the browser extension, the initial fully-stacked price in the first user interface, along with product summary information;

in response to the user adding the product to the wish list, storing the initial fully-stacked price and product information in a database;

continuing, by a backend server, to track a fully-stacked price for the product, including periodically checking for any changes to the web price, shipping charges, coupon discounts, and cashback rewards or other applicable rewards, and periodically recalculating the fully-stacked price for the product to include any such changes, wherein a fully-stacked price is tracked for each item added to the wish list;

in response to identifying a drop in the fully-stacked price for the product as compared to the initial fully-stacked price, notifying, by the browser extension, the user of the drop in the fully-stacked price; and providing, by the browser extension, a second wish list user interface within a user's web browser, wherein the wish list contents are displayed in the second user interface, including the fully-stacked price for each item added to the wish list and an indication of a drop in the fully-stacked price for the product, wherein display of the second user interface does not affect the content of the webpage viewed within the web browser.

12. The system of claim 11, wherein, in indicating the fully-stacked price drop, the second user interface indicates whether the price drop is due to a decrease in the website price, decrease in the shipping cost, an increase in the cashback or other reward, and/or the application of a new coupon.

13. The system of claim 11, wherein calculating the fully-stacked price, providing the first user interface, and enabling a user to add products to the wish list comprises:
    detecting, by a browser extension, a new webpage being loaded into a browser;
    identifying, by the browser extension, the webpage as a product page;
    obtaining a fully-stacked price for a product on the webpage based on a price retrieved from the webpage, a shipping charge associated with purchase of the product on the website, one or more rewards available for use in purchasing the product on the website, and a best coupon available for use in purchasing the product on the website;
    displaying, by the browser extension, a clickable call-to-action overlay on the webpage in order to facilitate the user adding the product to the wish list;
    in response to the user clicking on the call-to-action overlay, generating, by the browser extension, a modal window that overlays a portion of the webpage and displaying in the modal window, a largest image retrieved from the webpage, a product title retrieved from the webpage, and the fully-stacked price;
    from within the modal window, enabling, by the browser extension, a user to select a wish list and add the product associated with the displayed image to the selected wish list; wherein a user is able to add different products from different merchants and webpages to a wish list; and In response to a user adding the product to a wish list, sending information related to the product and the user's wish list from the browser extension to a server, which updates a wish list database.

14. The system of claim 13, further comprising:
periodically executing on the server jobs that obtain from one or more relevant data source the following: a current website price for the product, a shipping charge associated with purchase of the product on the website, a cashback reward available for use in purchasing the product on the website, and a best coupon available for use in purchasing the product on the website;
periodically calculating, by the server, a fully-stacked price for the product and comparing the fully-stacked price to a previously calculated fully-stacked price, wherein the fully-stacked price is calculated from the current web price, shipping charge, best applicable coupon, and cashback reward obtained by the jobs executed by the server;
in response to a drop in the fully-stacked price, alerting the browser extension to a drop in the fully-stacked price for the product;
displaying, by the browser extension, a browser notification of the fully-stacked price drop in the browser; and
in response to a user clicking on the browser notification or an icon for the browser extension, displaying, by the browser extension, the second user interface in a modal window, including displaying the drop in the fully-stacked price for the product.

15. The system of claim 14, further comprising enabling the user to purchase the product from within the wish list.

16. The system of claim 14, wherein, in the first user interface, a user can create a new wish list or select from a plurality of wish lists.

17. A non-transitory computer-readable medium comprising a computer program, that, when executed by a computer system, enables the computer system to perform the following method for providing a wish list user interface within a browser that alerts a user to a drop in a fully-stacked price, the method comprising:
    detecting, by a browser extension, a new webpage being loaded into a browser;
    identifying, by the browser extension, the webpage as a product page;
    obtaining, by the browser extension, a fully-stacked price for a product associated with the image based on the price associated with the image, a shipping charge associated with purchase of the product on the website, a cashback reward available for use in purchasing the product on the website, and a best coupon available for use in purchasing the product on the website;
    identifying, by the browser extension, a largest image on the webpage;
    displaying, by the browser extension, a clickable call-to-action overlay on the webpage for a period of time;
    in response to the user clicking on the call-to-action overlay, generating, by the browser extension, a modal window that overlays a portion of the webpage and displaying in the modal window, the largest image, a product title retrieved from the webpage, and the fully-stacked price;
    from within the modal window, enabling, by the browser extension, a user to select a wish list and add the product associated with the displayed image to the selected wish list; wherein a user is able to add different products from different merchants and webpages to a wish list;

in response to a user adding the product to a wish list, sending information related to the product and the user's wish list from the browser extension to a server, which updates a wish list database;

for each item added to the wish list:
- periodically executing on the server jobs that obtain from one or more relevant data sources the following: a current website price for the product, a shipping charge associated with purchase of the product on the website, one or more rewards available for use in purchasing the product on the website, and a best coupon available for use in purchasing the product on the website, wherein the reward(s) available includes a cashback reward, and
- periodically calculating, by the server, a fully-stacked price for the product and comparing the fully-stacked price to a previously calculated fully-stacked price, wherein the fully-stacked price is calculated from the current website price, shipping charge, best applicable coupon, and cashback reward obtained by the jobs executed by the server;

in response to a drop in the fully-stacked price for the product, alerting the browser extension to a drop in the fully-stacked price for the product, wherein the alert is sent by the server;

displaying, by the browser extension, a browser notification of the identified fully-stacked price drop in the browser; and in response to a user clicking on the browser notification or an icon for the browser extension, displaying, by the browser extension, the wish list user interface in a modal window, including displaying the fully-stacked price for each item added to the wish list and the drop in the fully-stacked price for the product.

18. The non-transitory computer-readable medium of claim 17, further comprising enabling the user to purchase the product from within the wish list.

19. The non-transitory computer-readable medium of claim 17, wherein, from the modal window, a user can create a new wish list or select from a plurality of wish lists.

20. The non-transitory computer-readable medium of claim 17, wherein the browser extension determines if the largest image exceeds a threshold size and only proceed with displaying the call-to-action overlay if the largest image exceeds the threshold.

* * * * *